United States Patent

[11] 3,540,477

[72] Inventor Joseph E. Hogel
River Grove, Illinois
[21] Appl. No. 808,268
[22] Filed March 18, 1969
[45] Patented Nov. 17, 1970
[73] Assignee Honeywell Inc.,
Minneapolis, Minnesota
a corporation of Delaware

[54] PNEUMATIC SUPPLY-EXHAUST CIRCUIT
12 Claims, 2 Drawing Figs.

[52] U.S. Cl. ................................................. 137/608,
235/201
[51] Int. Cl. ................................................. F15c 3/04
[50] Field of Search ...................................... 137/561,
608; 235/(Consulted), 200, 201

[56] References Cited
UNITED STATES PATENTS
3,318,329 5/1967 Norwood ...................... 137/608X
3,407,846 10/1968 Brandenberg ................ 137/608
3,433,257 3/1969 Jensen ........................... 137/561

OTHER REFERENCES
R. E. Norwood, and M. R. Noll, "Shift Register with Pneumatically Controlled Latch and Control Elements" in I.B.M. Technical Disclosure Bulletin, vol. 7, No. 4, Sep. 1964, pp. 297—99.
M. R. Noll, and R. E. Norwood, "Pneumatically-Controlled Logic Circuits" in I.B.M. Technical Disclosure Bulletin, vol. 7, No. 4, Sep. 1964, pp. 295—96.

Primary Examiner—William R. Cline
Attorneys—Lamont B. Koontz, Francis A. Sirr and John S. Sumners ABSTRACT: A pneumatic logic circuit is disclosed that performs a supply-exhaust function in response to a variable input pressure. The circuit consists of a plurality of miniaturized valves each of which uses a diaphragm as the only moving part. Functionally, the circuit can be broken down into two groups of valves, the first of which responds to the variable input pressure by either supplying pressure to or exhausting pressure from a pressure line. The second group controls the communication of pressure in the line to a pressure outlet as a function of variable input pressure.

Patented Nov. 17, 1970
3,540,477
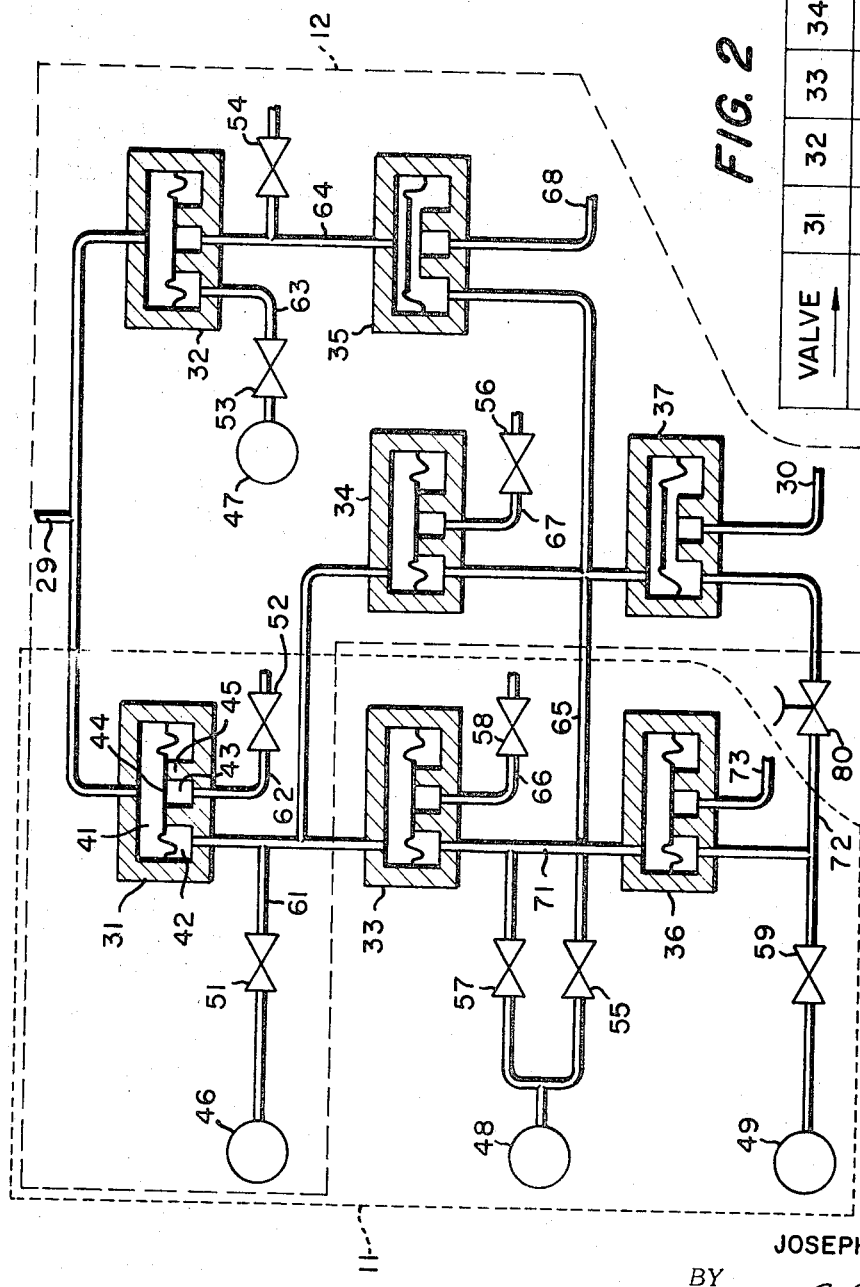
INVENTOR.
JOSEPH E. HOGEL
BY
ATTORNEY.

PNEUMATIC SUPPLY-EXHAUST CIRCUIT

The invention disclosed and described is a pneumatic logic circuit that performs a supply-exhaust function. While this function is generally provided by a pneumatic relay that employs diaphragms, levers, springs, valving members and the like, the subject invention employs a plurality of small valves each of which uses a diaphragm as the only moving part.

The supply-exhaust output characteristic corresponding to either an increasing or decreasing variable input pressure ordinarily consists of (a) supplying pressure to an outlet; (b) maintaining constant pressure at the outlet; and (c) exhausting pressure from the outlet. The pneumatic logic circuit accomplishes this with two groups of diaphragm valves, the first of which performs functions (a) and (c) by supplying pressure to or exhausting pressure from a pressure line in response to the variable input pressure. The second group of valves performs function (b) by controlling the communication of pressure in the line to the outlet in response to the variable input pressure.

Because of the nature of small diaphragm valves, all of the pneumatic circuit components can be formed in a single integrated member, resulting in a small, reliable unit that operates with a minimum of moving parts.

BRIEF DESCRIPTION OF THE DRAWING

FIG. 1 is a schematic representation of a pneumatic logic circuit that performs a supply-exhaust function.

FIG. 2 is a truth table indicating operation of the pneumatic logic circuit.

DESCRIPTION OF THE PREFERRED EMBODIMENTS

The pneumatic logic circuit disclosed in FIG. 1 consists of seven pressure responsive valves 31—37, each of which has a control chamber 41, an inlet chamber 42, an outlet chamber 43, a diaphragm 44 and an annular ridge 45 upon which diaphragm 44 seats. Numbers 41—45 are shown only with respect to valve 31, but like numbers apply to each of the other valves 32—37. When pressure admitted to control chamber 41 is great enough, diaphragm 44 seats on ridge 45 and prevents the communication of pressure between chambers 42 and 43.

Control chambers 41 of diaphragm valves 31 and 32 are adapted for connection with a variable input pressure by means of a conduit 29.

Inlet chamber 42 of diaphragm valve 31 receives a supply of regulated pressure from a source 46 through a conduit 61 that includes a restriction 51. Conduit 61 is further connected to the control chamber 41 of diaphragm valves 33 and 34. A conduit 62 including a restriction 52 allows the pressure in outlet chamber 43 of diaphragm valve 31 to be vented to atmosphere.

The inlet chamber 42 of valve 32 receives a supply of regulated pressure from a source 47 through a conduit 63 having a restriction 53. Outlet chamber 43 of valve 32 is connected to the control pressure chamber 41 of valve 35 by a conduit 64, which is vented to atmosphere through a restriction 54.

A source 48 supplies regulated pressure through a restriction 55 and a conduit 65 to the inlet chambers 42 of valves 34 and 35, and to the control chamber 41 of valve 37. Outlet chamber 45 of valve 34 is vented to atmosphere through a conduit 67 and restriction 56, while outlet chamber 43 of valve 35 passes unrestricted to atmosphere through a conduit 68.

Regulated pressure supply 48 is also connected, through a restriction 57, to the inlet chamber 42 of valve 33, and through a conduit 71 to the control chamber 41 of valve 36.

Regulated pressure from a source 49 passes through a restriction 59 and a conduit 72 to the inlet chamber 42 of valve 36. Conduit 72 includes a variable restriction 80 upstream of its connection to inlet chamber 42 of diaphragm valve 37. Outlet chamber 43 of valve 36 communicates directly with atmosphere through a conduit 73, while conduit 30, which serves as the circuit output, is connected to the outlet chamber 43 of diaphragm valve 37.

An alternative method of describing the interconnection of diaphragm valves and pressure sources is to the effect that the inlet chambers 42 of valves 31—36 are each adapted for connection with a restricted source of fluid pressure; the outlet chambers 43 of valves 31—34 each communicate with atmosphere through a fluid restriction; the outlet chambers 43 of valves 35 and 36 each communicate directly with atmosphere; the control chambers 41 of valves 31 and 32 are adapted for connection with a variable pressure; conduit 61 connects inlet chamber 42 of valve 31 with control chambers 41 of valves 33 and 34; conduit 64 connects the outlet chamber 43 of valve 32 with the control chamber 41 of valve 35; conduit 71 connects the inlet chamber 42 of valve 33 with the control chamber 41 of valve 36; conduit 65 connects the inlet chambers 42 of valves 34 and 35 with the control chamber 41 of valve 37; conduit 72, which includes variable restriction 80, connects the inlet chamber 42 of valve 36 with the inlet chamber 42 of valve 37; and conduit 30, which is connected to the outlet chamber 43 of valve 37, serves as the circuit outlet.

Functionally, operation of the pneumatic circuit can be analyzed by observing the valve groupings as represented by the dotted lines of FIG. 1. One group falls within the area enclosed by a dotted line 11 and includes valves 31, 33 and 36. The other group is bounded by a dotted line 12 and includes valves 31, 32, 34, 35 and 37. Because the operation of valve 31 affects the operation of both valves 33 and 34, which are in separate groups, valve 31 is considered to be in both groups.

If it is assumed that the variable input pressure has an overall pressure range that can be broken down into first, second and third pressure ranges which increase pressurewise in the stated order, then it can be stated that the broad function of the first group of valves is to provide an output pressure in conduit 72 of a first order of magnitude in response to the variable input pressure in the first range, and an output pressure of a second order of magnitude in response to the variable input pressure in the second and third ranges.

Specifically, this function is accomplished in part by relating the parameters of diaphragm valve 31 so that its diaphragm 44 seals the annular ridge 45 when the variable input pressure passes from the first to the second operating range. When this happens the pressure in conduit 61, which was previously bled to atmosphere through conduit 62 and restriction 52, begins to build up until the diaphragm 44 of valve 33 closes on its associated annular ridge 45. This causes a similar build up of pressure in conduit 71, causing valve 36 to close. The pressure in conduit 72 begins to increase by virtue of its connection with pressure source 49, thus resulting in an output pressure of a "second order of magnitude" that corresponds to the variable input pressure in the second range.

With the variable input pressure in the first range, valves 31, 33 and 36 are all open by virtue of the pressure in the respective chambers 41 being less than the pressure in the respective chambers 42, resulting in the exhausting of pressure in conduit 72 to atmosphere through conduit 73. "First order of magnitude" therefore describes the output pressure in conduit 72 in a decreasing or exhausting state.

Broadly speaking, the function of the valves in the second group with respect to the variable input pressure is to receive the output pressure from the first group of valves and allow passage of that pressure to a pressure outlet when the variable input pressure is in the first and third ranges, and to preclude passage when the variable input pressure is in the second range.

The accomplishment of this function can be better understood by breaking the valves of group two (dotted line 12) into a first subgroup including valves 31 and 34, a second subgroup including valves 32 and 35 and a third subgroup including valve 37.

For the first subgroup, a variable input pressure in the first range allows valve 31 to open, thereby allowing the pressure in conduit 61 to bleed down and allow valve 34 to open. Therefore, when the variable input pressure is in the first range valve 34 allows the pressure in conduit 65 to be exhausted through conduit 67 and restriction 56. When the variable input pressure reaches the second range, valves 31 and 34 close so that pressure in conduit 65 cannot escape through conduit 67 and restriction 56.

With respect to the operation of the second subgroup of valves, the parameters for valve 32 are chosen so that it is open when the variable input pressure in conduit 29 is in the first and second ranges, and is closed when the variable input pressure is in the third range. With valve 32 open, the pressure in conduit 64 builds up (the resistance value of restriction 53 is less than that of restriction 54), and valve 35 closes to prevent the venting of pressure to atmosphere through conduit 68. When the variable input pressure is in the third range valve 32 is closed, and valve 35 opens due to the loss of pressure in its control chamber 41 through restriction 54. The pressure in conduit 65 is therefore exhausted to atmosphere through conduit 68.

The pressure in conduit 65 determines whether the third subgroup valve 37 is opened or closed. From the foregoing discussion, it is evident that there are three possible operating combinations for the valves 34 and 35—both closed, and alternative positions of one open and one closed. Because of the venting conduits 67 and 68, the only combination that will allow pressure in conduit 65 to build up and close valve 37 is with both valves 34 and 35 closed. This occurs only when the variable input pressure is in its second range, the pressure in conduit 65 being exhausted through conduits 67, 68 under all other conditions.

Broadly restating the overall function, the first valve group exhausts pressure from conduits 72 when the variable input pressure is in the first range, and adds pressure to conduit 72 when the variable input pressure is in the second and third ranges. The second valve group receives the pressure in conduit 72 and allows it to pass to the pressure outlet 30 when the variable input signal is in the first and third ranges, and blocks the outlet when the variable input pressure is in the second range.

The purpose of variable restriction 80 is to throttle flow between valves 36 and 37 so that the pressure at outlet 30 does not immediately fall to atmospheric pressure when valve 37 opens with valve 36 open, and so that the outlet pressure does not immediately increase to the level of supply pressure when valve 37 opens with valve 36 closed. An intermediate pressure can therefore be obtained and held at outlet 30 without the use of external feedback or an input pressure that varies rapidly with respect to time.

Because valve 37 blocks the communication of pressure between conduit 72 and conduit 30 when the input pressure is in the second range, the state of pressure in conduit 72 as generated by the first group of valves in response to the input pressure in that range is unimportant. In the preferred embodiment this pressure is of the second order of magnitude, or in the increasing state.

A typical operating range for the variable input pressure is 0—16 p.s.i. For such a range, the parameters relating to diaphragm 31 can be chosen so that the valve closes when the input pressure in conduit 29 is 3 p.s.i. or greater. Similarly, diaphragm 32 can be designed to close at 4 p.s.i. or greater.

FIG. 2 is a truth table showing operation of the valves 31-—37 for the given ranges of input pressure ($P_i$), and the resulting output pressure ($P_o$). For the 0—16 p.s.i. range, the "first range" is 0—3 p.s.i., the "second range" is 3—4 p.s.i. and the "third range" is 4—16 p.s.i. With these ranges, operation of the pneumatic logic circuit can be deduced from the foregoing discussion coupled with the truth table of FIG. 2, in which "O" and "C" refer to the open or closed position of each respective valve. FIG. 1 discloses the position of the valves 31—37 for an input pressure in the third range; i.e., $P_i$ is greater than 4 p.s.i.

I claim:
1. Apparatus for providing an output pressure of a desired characteristic in response to a variable input pressure having a first, second and third range, comprising:
   first pressure responsive means for providing a first pressure of a first order of magnitude in response to the input pressure in the first range, and a first pressure of a second order of magnitude in response to the input pressure in the third range; and
   second pressure responsive means responsive to the input pressure for controlling the passage of the first pressure to a pressure outlet, the second means allowing passage when the input pressure is in the first and third ranges, and precluding passage when the input pressure is in the second range.
2. The apparatus as defined by claim 1, wherein the first means provides a first pressure of a second order of magnitude in response to the input pressure in the second range.
3. The apparatus as defined by claim 1, wherein the second pressure responsive means comprises:
   third pressure responsive means for providing a second pressure of a first order of magnitude in response to the input pressure in the first range, and a second pressure of a second order of magnitude in response to the input pressure in the second and third ranges;
   fourth pressure responsive means for providing a third pressure of a third order of magnitude in response to the input pressure in the first and second ranges, and a third pressure of a second order of magnitude in response to the input pressure in the third range; and
   fifth pressure responsive range for controlling passage of the first pressure to the pressure outlet, the fifth pressure responsive means responsive to the second and third pressures and arranged to preclude passage when the second and third pressures are in their second and first orders of magnitude, respectively, and to allow passage for all other second and third pressure combinations.
4. The apparatus as defined by claim 3, wherein the third pressure responsive means comprises:
   first and second valve means each of which has an inlet, and outlet, a pressure responsive member movable between an open position and a closed position to establish or preclude communication between the inlet and outlet and a control input communicating with the pressure responsive member;
   the inlets of the first and second valve means adapted for connection to a restricted supply of fluid pressure;
   the outlets of the first and second valve means communicating with atmosphere through a fluid restriction;
   first conduit means connecting the inlet of the first valve means with the control input of the second valve means; and
   second conduit means connecting the inlet of the second valve means with the fifth pressure responsive means.
5. The apparatus as defined by claim 3, wherein the fourth pressure responsive means comprises:
   third and fourth valve means each of which has an inlet, an outlet, a pressure responsive member movable between an open position and a closed position to establish or preclude communication between the inlet and outlet and a control input communicating with the pressure responsive member;
   the inlets of the third and fourth valve means adapted for connection to a restricted supply of fluid pressure;
   the outlet of the third valve means communicating with atmosphere through a fluid restriction;
   the outlet of the fourth valve means communicating directly with atmosphere;
   third conduit means connecting the outlet of the third valve means with the control input of the fourth valve means; and
   fourth conduit means connecting the inlet of the fourth valve means with the fifth pressure responsive means.
6. The apparatus as defined by claim 3, wherein the fifth pressure responsive means comprises:

a fifth valve means having an inlet, an outlet, a pressure responsive member movable between an open position and a closed position to establish or preclude communication between the inlet and outlet and a control input communicating with the pressure responsive means;

the control input of the fifth valve means arranged to receive the second and third pressures;

the inlet of the fifth valve means arranged to receive the first pressure; and the outlet of the fifth valve means serving as the pressure outlet for the apparatus.

7. The apparatus as defined by claim 1, and further comprising throttling means disposed between the first and second pressure responsive means for restricting the flow of fluid toward and away from the pressure outlet.

8. A pneumatic circuit comprising:

first, second, third, fourth, fifth, sixth and seventh valve means, each of which has an inlet, an outlet, a pressure responsive member movable between an open position and a closed position to establish or preclude communication between the inlet and outlet and a control input communicating with the pressure responsive means;

the inlets of the first, second, third, fourth, sixth and seventh valve means adapted for connection with a restricted supply of fluid pressure;

the outlets of the first, second, third and sixth valve means each communicating with atmosphere through a fluid restriction;

the outlets of the fourth and seventh valve means communicating directly with atmosphere;

the control inputs of the first and third valve means adapted for connection with a variable pressure;

the pressure responsive member of the first valve means constructed and arranged to be moved when the variable pressure is at a first value;

the pressure responsive member of the third valve means constructed and arranged to be moved when the variable pressure is at a second value;

first conduit means connecting the inlet of the first valve means with the control inputs of the second and sixth valve means;

second conduit means connecting the inlet of the second valve means with the control input of the fifth valve means;

third conduit means connecting the outlet of the third valve means with the control input of the fourth valve means;

fourth conduit means connecting the inlet of the fourth valve means with the control input of the fifth valve means;

fifth conduit means connecting the inlet of the sixth valve means with the control input of the seventh valve means;

sixth conduit means connecting the inlet of the seventh valve means with the inlet of the fifth valve means; and the outlet of the fifth valve means serving as the circuit outlet.

9. The pneumatic circuit as defined by claim 8, wherein the movable members of the respective valve means are each moved from the open position to the closed position in response to increasing variable pressure.

10. The pneumatic circuit as defined by claim 9, wherein the respective valve means each comprises:

a housing;

diaphragm means dividing the housing into first and second pressure chambers;

ridge means disposed in the second pressure chamber and arranged to operate in sealable relation with the diaphragm means to further define an inlet pressure chamber and an outlet pressure chamber within the second pressure chamber;

the control input communicating with the first pressure chamber;

the inlet communicating with the inlet pressure chamber; and the outlet communicating with the outlet pressure chamber.

11. The pneumatic circuit as defined by claim 9, wherein the first value at which the first valve means closes is less than the second value at which the third valve means closes.

12 The pneumatic circuit as defined by claim 8, and further comprising a fluid restriction disposed in the sixth conduit means.